J. CHESLER.
CONTROLLING DEVICE FOR MOTION PICTURE MACHINES.
APPLICATION FILED OCT. 28, 1914.
1,245,192.
Patented Nov. 6, 1917.
2 SHEETS—SHEET 1.
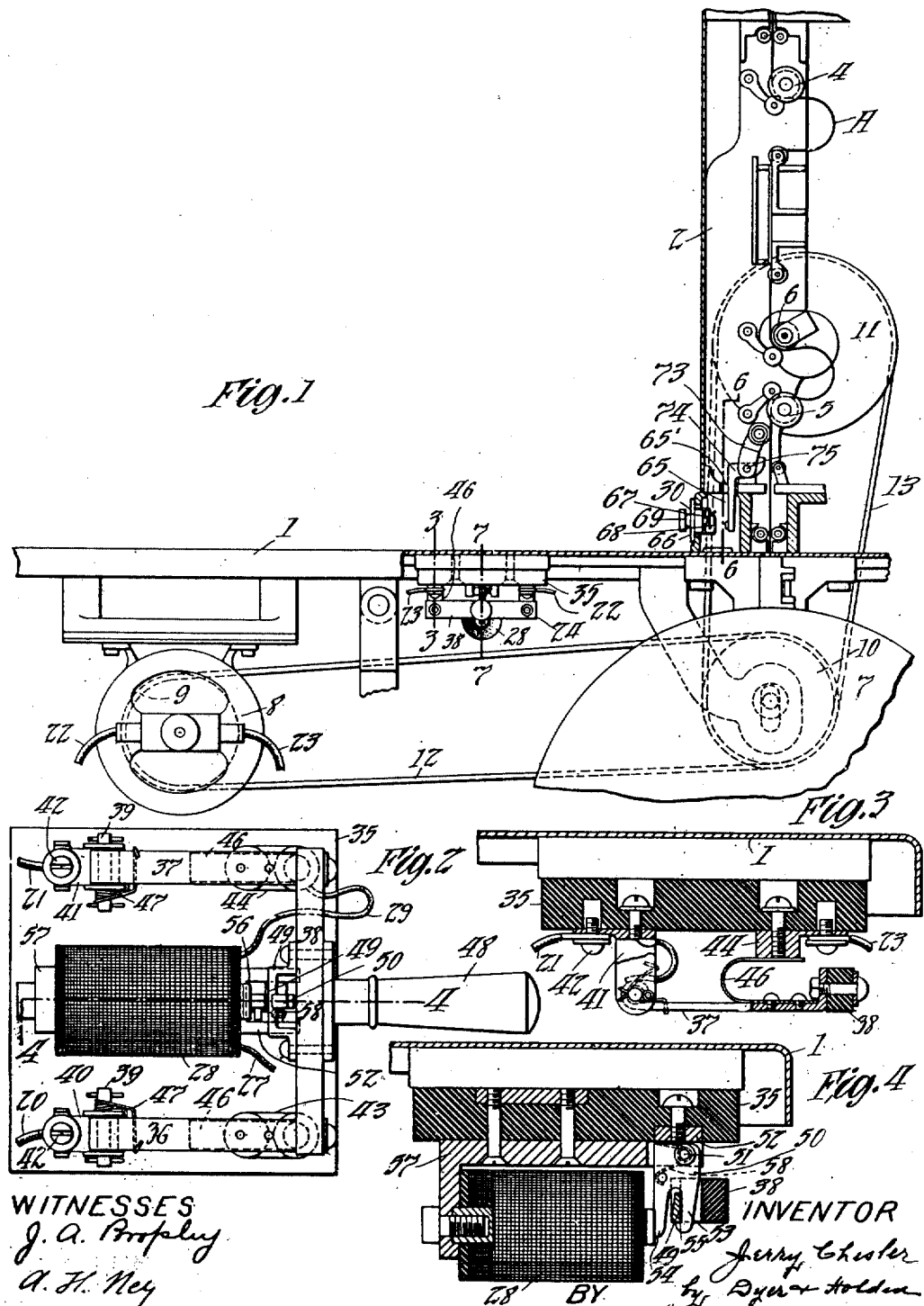

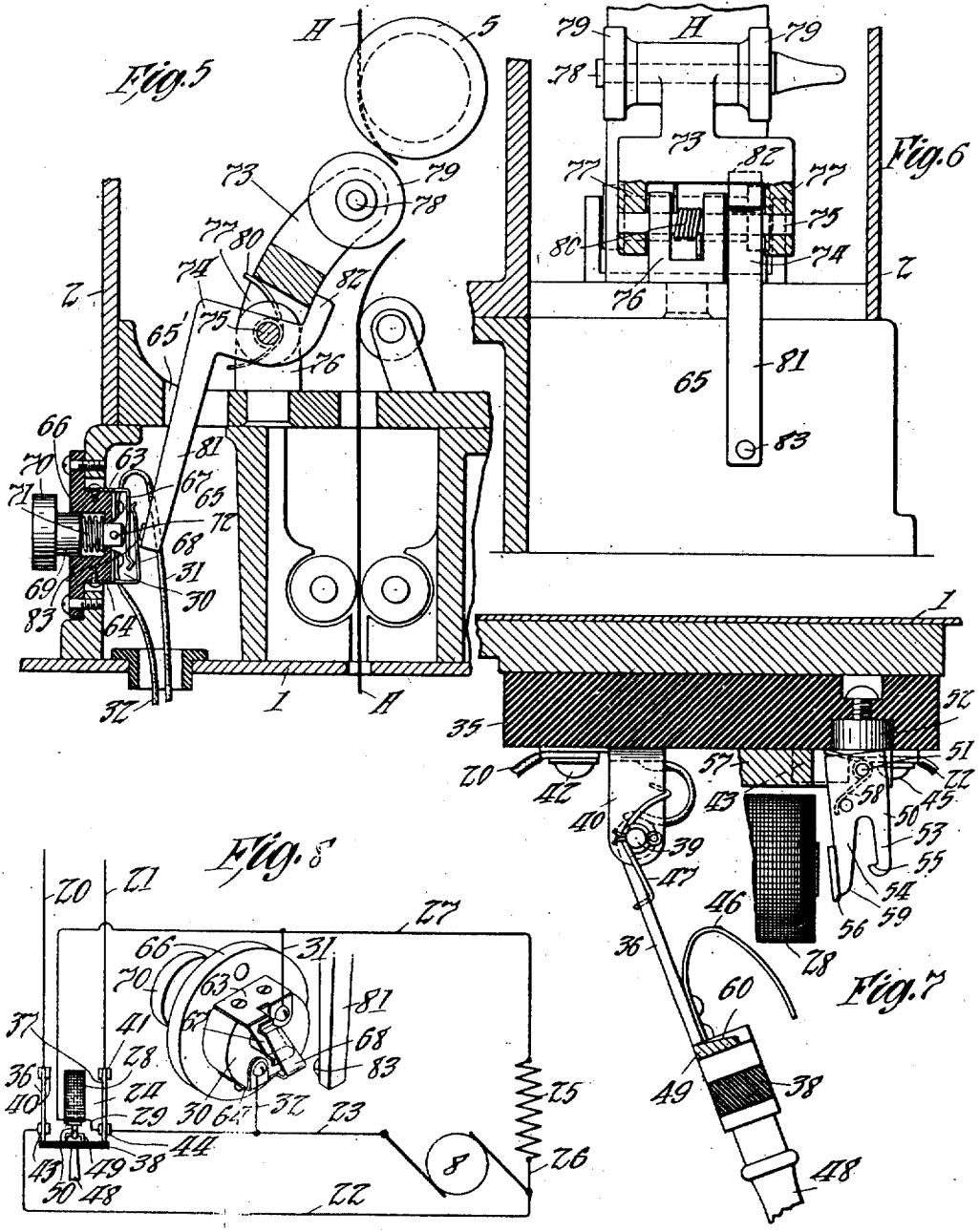

UNITED STATES PATENT OFFICE.

JERRY CHESLER, OF EAST ORANGE, NEW JERSEY, ASSIGNOR TO NEW JERSEY PATENT COMPANY, OF WEST ORANGE, NEW JERSEY.

CONTROLLING DEVICE FOR MOTION-PICTURE MACHINES.

1,245,192.   Specification of Letters Patent.   Patented Nov. 6, 1917.

Application filed October 28, 1914.   Serial No. 868,923.

*To all whom it may concern:*

Be it known that I, JERRY CHESLER, a subject of the Czar of Russia, and a resident of East Orange, in the county of Essex and State of New Jersey, have invented certain new and useful Improvements in Controlling Devices for Motion-Picture Machines, of which the following is a description.

My invention relates to controlling devices for motion picture machines, and more particularly to controlling devices for motor driven motion picture machines, and the principal object thereof is to automatically effect the stopping of the operating mechanism of such machines when the film either breaks or runs out. My invention is preferably also designed to effect the stopping of the operating mechanism of a motion picture machine at any time by a simple manual operation.

Another object of my invention is to provide an improved electrical controlling device of this character which is simple in construction and efficient in operation and which is so designed and arranged as to utilize but very little current and avoid any appreciable sparking in the operation thereof, especially in the vicinity of the film in the machine.

Other objects and features of my invention reside in the details of construction and combinations of elements hereinafter more fully described and claimed.

In order that my invention may be more clearly understood, attention is directed to the accompanying drawings forming part of this specification, and in which:—

Figure 1 represents a side elevational view, partly broken away and partly in section, of a motion picture machine with my invention applied thereto, showing the parts in the normal position they occupy when a film is passing through the machine, the wiring being omitted from this figure to avoid confusion;

Fig. 2 is an enlarged bottom plan view of the motor circuit controlling switch of my improved controlling device, shown in closed position;

Fig. 3 is an enlarged sectional view, partly in elevation, taken on line 3—3 of Fig. 1;

Fig. 4 is a sectional view, partly in elevation, taken on line 4—4 of Fig. 2, parts being omitted;

Fig. 5 is an enlarged detailed sectional view of a portion of the apparatus shown in Fig. 1, with the parts thereof in the position they assume when the film in the motion picture machine breaks or runs out;

Fig. 6 is an enlarged sectional view taken on line 6—6 of Fig. 1;

Fig. 7 is an enlarged fragmental sectional view, partly in elevation and partly broken away, taken approximately on line 7—7 of Fig. 1, and showing the switch in open position; and Fig. 8 is a wiring diagram of the apparatus as shown in Fig. 1.

The same reference characters will be used throughout the several views of the drawings to designate corresponding parts.

Referring to the drawings, reference character 1 represents a support or frame on which the "head" 2 of the motion picture machine is supported. The film A is drawn from the usual supply reel (not shown) and driven through the "head" 2 and intermittently past the projection aperture thereof in the usual manner by mechanism comprising the continuously driven upper and lower sprockets 4 and 5 and the intermediate intermittently driven sprocket 6. From the lower sprocket 5 the film passes to the usual take-up reel (not shown) in the magazine 7 which is suitably supported from the frame 1. Reference character 8 represents an electric motor which is suitably supported from the under side of the frame 1 and drives the film moving mechanism as by means of pulleys 9, 10 and 11 and belts 12 and 13 connecting these pulleys.

The motor illustrated is a direct current motor having a shunt field, although I may use an alternating current motor in place thereof when necessary or desired. Referring especially to Fig. 8, the brushes of the motor are respectively connected to direct current mains 20 and 21 by means of conductors 22 and 23 and a motor circuit controlling switch 24, the details of which will be hereinafter more fully described. The field winding 25 of the motor is connected to one side of the motor by a conductor 26 and to the other side thereof through a conductor 27, the coils of a magnet 28 controlling the switch 24, a conductor 29, and the conductor 23. A normally open switch 30 is connected across conductors 27 and 23 between the field winding 25 and the magnet 28, by means of conductors 31 and 32. This switch when closed is adapted to short circuit the magnet 28 to deënergize the same and thereby effect the breaking of the motor circuit as will presently appear.

Switch 24 is mounted on an insulating block 35 which is suitably secured to the under side of frame 1, preferably between the motor 8 and the "head" 2 of the moving picture machine. This switch preferably consists of a member having two parallel spaced arms 36 and 37, made of metal or other conductive material, connected at one end by a bar 38 of insulating material and respectively hinged at the other end, as by means of pins 39, to contact pieces 40 and 41, which are suitably secured to the block 35. Contact pieces 40 and 41 are respectively connected to the mains 20 and 21 as by means of binding screws 42. In addition to the contact pieces 40 and 41, the insulated block 35 has secured thereto a pair of contact pieces 43 and 44 to which the conductors 22 and 23 are respectively connected as by means of binding screws 45. Each of the arms 36 and 37 of switch 24 has secured thereto at its outer end one leg of a light U-shaped spring contact 46, these contacts being adapted to engage the contact pieces 43 and 44 when the switch 24 is moved upwardly about the pins 39 toward the position shown in Figs. 1 and 3, to thereby close the motor circuit. Coiled springs 47 surrounding pins 39 and coacting with contact pieces 40 and 41 and arms 36 and 37 of the switch, constantly tend to swing the latter downwardly about the pins 39 to the position shown in Fig. 7 to thereby break the motor circuit. The bar 38 of the switch has secured thereto substantially midway of its length a handle 48 and a U-shaped catch or latch member 49. The catch 49 is adapted to coact with a latch member 50 pivoted at 51 on a supporting member 52 which is fixedly secured in any suitable manner to the block 35, to lock the switch in circuit closing position. The latch member 50 has two spaced arms or forks 53 and 54, the arm 53 being provided at its end with a shoulder 55, and the arm 54 being provided at its end with a piece 56 of soft iron or the like comprising an armature. The base of the U-shaped catch 49 enters the space between the arms 53 and 54 when switch 24 is swung upwardly about the pins 39, the shoulder 55 of arm 53 being adapted to engage the under side of said base portion to lock the switch in circuit closing position as shown in Fig. 4. The magnet 28 is suitably supported from the block 35 between the arms 36 and 37 of switch 24, as by means of a bracket 57, in such a position that its core is opposed to the armature 56 of the latch member 50. One end of the winding of magnet 28 is connected to conductor 27 leading to the field winding 25 of the motor 8, while the other end of such winding is connected by conductor 29 to the contact piece 44. When energized, magnet 28 attracts armature 56 and draws latch member 50 to and holds it in locking position. A spring 58 constantly tends to force latch member 50 away from magnet 28 to its releasing position, the movement of member 50 in this direction being limited by an upper edge portion thereof engaging a shoulder formed on the supporting member 52, as clearly shown in Fig. 7. The arm 54 of latch member 50 and the base of the U-shaped catch 49 are respectively provided with coacting cam surfaces 59 and 60 adapted, when switch 24 is moved toward circuit closing position and the catch 49 enters the space between arms 53 and 54, to impart an initial movement of the latch member 50 toward magnet 28.

The switch 30 comprises a pair of metallic contact pieces 63 and 64, preferably formed by stamping, which are disposed within a chamber 65 formed in the lower part of the frame of the "head" 2 of the motion picture machine adjacent the path of the film, and which are secured to an insulating member 66 mounted in an opening formed in one wall of the chamber 65. The contact pieces 63 and 64 are respectively connected to conductors 27 and 23 by means of conductors 31 and 32, and are respectively provided with coacting spring contact fingers 67 and 68. The spring contacts 67 and 68 constantly tend to assume a spaced relation, as shown in Fig. 1, but are adapted to be forced into engagement to close the switch, both by manually operable means and by automatically operable means controlled by the film in the motion picture machine.

The manually operable means for closing switch 30 consists of a pin 69 extending loosely through member 66, the outer end of this pin being provided with a button 70 and the inner end thereof being adapted to engage the spring contact 67 to force the same toward spring contact 68. A spring 71 constantly tends to move the pin 69 outwardly to inoperative position, this outward movement being limited by a stop 72 secured to the inner end portion of pin 69 engaging the inner side of member 66, as shown in Fig. 5.

The automatically operable means for controlling switch 30 comprises two members 73 and 74, each pivotally mounted on a pin 75 which is rigidly secured to the frame of the "head" 2 by means of a bracket 76. The member 73 is mounted on pin 75 at its lower end by means of a pair of integrally formed spaced lugs 77, the upper end of this member being provided with a pin 78 on which are mounted a pair of film engaging rollers 79. A spring 80 surrounds the pin 75 and coacts with member 73 so as to constantly tend to force the same about the pin 75 to move the upper end thereof across the path of the film just below the lower sprocket 5. Member 74 is mounted on pin 75 between the spaced lugs 77 of member 73 and consists of a long arm 81 which extends downwardly through an opening 65' in the upper wall of the chamber 65, and a short arm 82 which extends upwardly in front of the member 73. The lower end of arm 81 is positioned adjacent the spring contact finger 68 and is provided with a piece or button 83 of non-conductive material which, when this arm is moved toward the contact finger 68, is adapted to engage the latter and force it into engagement with the spring contact finger 67 to close the switch 30. Member 74, under the action of gravity, normally tends to assume a substantially vertical position with its arm 81 out of engagement with the spring contact finger 68.

The operation of the apparatus may be briefly described as follows:—

Assuming that a film is positioned in the "head" 2 so as to be moved therethrough upon the actuation of the film driving mechanism and that the switch 24 is in open position, it will be apparent that the motor and film driving mechanism will be at rest and that the member 73 will be maintained by the film and against the action of the spring 80 in such a position as to permit the member 74 to assume, under the action of gravity, a position out of engagement with the spring contact finger 68 of switch 30, in consequence of which the latter will be in open position. To start the motion picture machine operating it is now merely necessary to close the switch 24 by swinging it upwardly about the pins 39. On moving the switch 24 in this manner, the U-shaped spring contacts 46 will engage the contacts 43 and 44 to thereby close the motor circuit and the cam surface 60 of catch 49 will engage the cam surface 59 of arm 54 and impart an initial movement to the latch member 50 toward the core of magnet 28 so as to bring such latch member to a position in which it will be more readily influenced by the magnet. The closing of the motor circuit causes the magnet 28, which is in series with the shunt field 25 of the motor, to become energized, and by means of its action on armature 56, to move the latch member 50 against the action of spring 58 to locking position, in which armature 56 will engage the core of the magnet and shoulder 55 of the arm 53 will engage the under side of the catch 49 to thereby lock the switch 24 in circuit closing position, as shown in Figs. 1 and 4. The path of the current in the motor circuit will now be as follows: from one main 20, through contact piece 40, arm 36 of the switch 24, contact piece 43, conductor 22 to one brush of the motor 8, through the motor to the other brush thereof, then through conductor 23, contact piece 44, arm 37 of switch 24, contact piece 41, to the other main 21. A small part of the current will also pass from one side of the motor to the other through the conductor 26, the field winding 25, conductor 27, the coils of magnet 28, conductor 29, contact piece 44, and the conductor 23.

When the film runs out or breaks in its movement through the "head" 2, spring 80 will at once force member 73 about its pivot and across the normal path of the film. Thereupon, member 73 will, by reason of its engagement with the short arm 82 of member 74, move the latter about pin 75 and the button 83 on the arm 81 thereof against spring contact finger 68 to force the latter into engagement with the contact finger 67 and thereby effect the closing of switch 30, as shown in Fig. 5. This will effect the short circuiting of magnet 28, as the path of the current through the shunt field 25 will now be as follows: from one side of the motor through the conductor 26, field 25, conductor 27, conductor 31, switch 30, conductor 32, and conductor 23 to the other side of the motor. Magnet 28 being deënergized, spring 58 will immediately force latch member 50 to the position shown in Fig. 7 and release the switch 24, which under the influence of springs 42 and gravity will move to its open position, as shown in Fig. 7, and break the motor circuit. Spring contacts 46, which are somewhat compressed when the switch 24 is in its locked closed position, as shown in Fig. 3, will assist springs 42 and gravity in opening the switch when the latter is released. Switch 30 may also be closed at any time by merely pressing on button 70 to force the contact finger 67 into engagement with contact finger 68, whereupon the short circuiting of magnet 28 and the opening of the motor circuit will be effected, as just described.

Member 73, by reason of its being formed separate from member 74 and not integrally therewith, may be moved about its pivot and away from the path of the film (toward the left referring to Fig. 1) a considerable distance in order to facilitate the "threading" of the film through the machine.

It will be apparent that in the use of my invention no sparks will be generated in the vicinity of the film, as contacts 67 and 68 never separate or spring apart when current is flowing through switch 30, and when forced together they merely make a circuit.

Moreover, any sparks which might by any chance be generated at switch 30 would be prevented from affecting the film due to the disposal of the contacts of the switch within the chamber 65. But slight sparking is produced by the opening and closing of switch 24, due to the form and resiliency of the contacts 46 thereof and the manner in which the same are mounted which insure that these contacts will engage and disengage contact pieces 43 and 44 with a sort of sliding action. Switch 24, moreover, is located at such a distance from the path of the film that sparks generated in the operation thereof will not endanger the film.

When an alternating current motor is employed for driving the film operating mechanism, this motor is preferably of the type in which the stator constitutes the field thereof and the magnet 28 is connected in series with the stator. It will therefore be apparent that but little current is used in maintaining the magnet 28 of my improved controlling device energized, either when a direct current motor or an alternating current motor is employed, as the current flowing through the field of the motor is, in either case, small.

It is obvious that my invention may also be readily adapted for controlling the lamp circuit of a motion picture projecting machine as well as the motor circuit, by providing the lamp circuit with a switch similar to the switch 24, and a magnet and locking means therefor similar to the magnet 28 and locking means described herein.

While I have shown and described the preferred embodiment of my invention, it is to be understood that the same is subject to many changes and modifications without any departure from the spirit of my invention and the scope of the appended claims.

Having now described my invention, what I claim as new therein and desire to protect by Letters Patent is as follows:—

1. The combination with a motion picture machine and the actuating means thereof, of means comprising a normally closed auxiliary controlling circuit adapted to render said actuating means inoperative upon the short circuiting of a part thereof, and a member biased to a position for effecting the short circuiting of said part of said circuit, said member being maintained in an inoperative position by the engagement therewith of a film in its normal path through the machine but being released when the film breaks or runs out, substantially as described.

2. The combination with a motion picture machine and the film actuating mechanism thereof, of an electric motor for driving said mechanism, a motor circuit controlling switch biased to circuit breaking position, means comprising an electro-magnet in series with the field of the motor for locking said switch in circuit closing position, and means for short circuiting said electromagnet to release said switch, substantially as described.

3. The combination with a motion picture machine and the film actuating mechanism thereof, of an electric motor for driving said mechanism and having a shunt field, a motor circuit controlling switch biased to circuit breaking position, means comprising an electro-magnet in series with the field of the motor for locking said switch in circuit closing position, and means for short circuiting said electro-magnet to release said switch, substantially as described.

4. The combination with a motion picture machine and the film actuating mechanism thereof, of an electric motor for driving said mechanism, a motor circuit controlling switch biased to circuit breaking position, means comprising an electro-magnet in series with the field of the motor for locking said switch in circuit closing position, and means for automatically short circuiting said electro-magnet to release said switch when a film in the machine breaks or runs out, substantially as described.

5. The combination with a motion picture machine, of an electric operating circuit including a switch biased to open position, means including an electro-magnet for locking said switch in closed position, said means being operative to lock said switch closed only when said electro-magnet is energized, and means controlled by a film in said machine for automatically effecting the deënergizing of said electro-magnet to render said locking means inoperative when the film in the machine breaks or runs out, substantially as described.

6. The combination with a motion picture machine, of an electric circuit including a switch biased to open position, means for locking said switch in closed position, said means being biased to inoperative position, an electric circuit including an electro-magnet which is adapted when energized to render said locking means operative, and means coöperating with the electric circuit including the electro-magnet for automatically deënergizing said electro-magnet to release said locking means when a film in the machine breaks or runs out, substantially as described.

7. The combination of an electric motor driven motion picture machine, the motor circuit including a switch biased to open position, means comprising an electro-magnet for locking said switch in circuit closing position and operative only while the electro-magnet is energized, a normally open electric circuit adapted when closed to effect the deënergizing of said electro-magnet to thereby release said switch, and means comprising a member biased to a position to effect the closing of the normally open circuit, said member being held in inoperative position by a film in its normal path through the machine and being released when the film breaks or runs out, substantially as described.

8. The combination with a motion picture machine, of controlling means associated therewith consisting of a device controlled by a film in the machine, said device comprising an arm mounted for limited movement and normally tending to assume an inoperative position and a member coöperating with said arm and biased to operative position in which it intercepts the path of the film and engages said arm and holds the same in operative position, said member being held in inoperative position by the film in its normal path and being movable away from the film and beyond the limit of movement of said arm, substantially as described.

9. The combination with a motion picture machine, of an electric operating circuit including a switch, a normally closed controlling circuit, a normally open switch adapted when closed to effect the short circuiting of a part of said controlling circuit, the short circuiting of said part of said controlling circuit being adapted to effect the opening of the switch in the operating circuit and thereby the breaking of the latter, and means for effecting the closing of said second named switch upon the breaking or running out of the film in the machine, substantially as described.

10. The combination with a motion picture machine, of an electric circuit including a hinged switch which is biased to open position and has secured thereto a substantially U-shaped resilient contact, said circuit also including a stationary contact which is engaged by the U-shaped contact when the switch is closed, means for locking the switch in closed position with its U-shaped resilient contact compressed, and means for controlling said locking means comprising a device controlled by a film in the machine adapted to automatically effect the release of the locking means when the film breaks or runs out, substantially as described.

11. The combination with a motion picture machine and an electric motor for operating the same, of means comprising an auxiliary controlling circuit adapted upon the short-circuiting of a part of said circuit to effect the breaking of the motor circuit, a device biased to a position for effecting the short circuiting of said part of said controlling circuit, said device being maintained in inoperative position by a film in its normal path through the machine and being released when said film breaks or runs out, substantially as described.

12. The combination with a motion picture machine and the film actuating mechanism thereof, of an electric motor for driving said mechanism, a motor circuit controlling switch biased to circuit breaking position, means comprising an auxiliary controlling circuit including the field of the motor for locking said switch in circuit closing position when the controlling circuit is closed, said switch being released upon the short-circuiting of a part of said controlling circuit, and means for effecting the short-circuiting of said part of said controlling circuit when the film in the machine breaks or runs out, substantially as described.

This specification signed and witnessed this 22nd day of September, 1914.

JERRY CHESLER.

Witnesses:
WILLIAM A. HARDY,
MARY J. LAIDLAW.

Copies of this patent may be obtained for five cents each, by addressing the "Commissioner of Patents, Washington, D. C."